US011537736B2

(12) United States Patent
Kimon et al.

(10) Patent No.: US 11,537,736 B2
(45) Date of Patent: Dec. 27, 2022

(54) SYSTEM FOR DETECTING ANOMALOUS ACCESS TO TABLES

(71) Applicant: PayPal, Inc., San Jose, CA (US)

(72) Inventors: Liron Florens Ben Kimon, Ofqim (IL); Yotam Perkal, Beer-Sheva (IL); Yuri Shafet, Beer-Sheva (IL)

(73) Assignee: PayPal, Inc., San Jose, CA (US)

( * ) Notice: Subject to any disclaimer, the term of this patent is extended or adjusted under 35 U.S.C. 154(b) by 319 days.

(21) Appl. No.: 16/563,877

(22) Filed: Sep. 8, 2019

(65) Prior Publication Data

US 2021/0073409 A1    Mar. 11, 2021

(51) Int. Cl.
*G06F 21/62* (2013.01)
*G06F 16/9035* (2019.01)
*G06K 9/62* (2022.01)
*G06F 17/18* (2006.01)

(52) U.S. Cl.
CPC ...... *G06F 21/6227* (2013.01); *G06F 16/9035* (2019.01); *G06F 17/18* (2013.01); *G06F 21/6245* (2013.01); *G06K 9/6223* (2013.01)

(58) Field of Classification Search
CPC .. G06F 21/6227; G06F 16/9035; G06F 17/18; G06F 21/6245; G06F 21/554; G06K 9/6223

See application file for complete search history.

(56) References Cited

U.S. PATENT DOCUMENTS

| 7,181,438 B1* | 2/2007 | Szabo | G06F 21/6245 705/14.27 |
| 9,081,978 B1* | 7/2015 | Connolly | G06F 21/10 |
| 9,208,153 B1* | 12/2015 | Zaveri | G06F 16/335 |
| 10,680,907 B1* | 6/2020 | Meyer | H04L 63/10 |
| 2011/0072206 A1* | 3/2011 | Ross | G06F 3/0604 711/108 |
| 2014/0115096 A1* | 4/2014 | Burba | H04L 65/4084 709/217 |
| 2016/0162683 A1* | 6/2016 | Gibson | G06F 21/44 726/17 |
| 2017/0220947 A1* | 8/2017 | Tariq | G06Q 30/0202 |
| 2019/0236191 A1* | 8/2019 | Petschulat | G06F 16/24553 |
| 2020/0167423 A1* | 5/2020 | Jayasingh | G06F 12/0871 |
| 2020/0412726 A1* | 12/2020 | Nevatia | G06F 21/604 |

* cited by examiner

*Primary Examiner* — Meng Li
(74) *Attorney, Agent, or Firm* — Haynes and Boone, LLP

(57) ABSTRACT

A system and method for detecting anomalous access to tables is described. A query for accessing a table from a requesting user is received. A set of users similar to the requesting user is determined. The probability that the requesting user should access the table is calculated. Whether the user should be accessing the table based on the calculated probability is determined.

20 Claims, 5 Drawing Sheets

SYSTEM FOR DETECTING ANOMALOUS ACCESS TO TABLES

TECHNICAL FIELD

The subject technology generally relates to managing access to sensitive data and more particularly, relates to a system and method for detecting anomalous access to tables based on collaborative filtering.

BACKGROUND

Employees (e.g., developers, programmers, etc.) that work at corporations often need to run queries in order to read/write data for their daily work. In order to read/write data, these employees need access a variety of tables. Usually, teams and groups from similar branches within a corporation tend to access the same group of tables. Some of the tables may include sensitive data that, if fallen into the wrong hands, can be used in a manner detrimental to the corporation. In some scenarios, bad actors may take over an account within the organization and use the account to access data for use in a nefarious manner. Currently, there are very few, if any, effective ways for corporations to identify such types of internal threats, i.e., access via a legitimate employee account for illegitimate purposes. Consequently, corporations may be exposed to severe consequences that result from misappropriation of certain sensitive information accessed through seemingly authentic channels. Accordingly, there is a need for a system that detects anomalous access to information to provide alerts and/or restrictions.

SUMMARY

According to various aspects of the subject technology, a system for detecting anomalous access to tables is described. A query for accessing a table from a requesting user is received. A set of users similar to the requesting user is determined. The probability that the requesting user should access the table is calculated. Whether the user should be accessing the table based on the calculated probability is determined.

According to various aspects of the subject technology, a method for detecting anomalous access to tables is described.

A query for accessing a table from a requesting user. That the requesting user does not have table access history is determined. A set of users closest to the requesting user is identified. The probability that the requesting user should access the table is calculated. Whether the user should be accessing the table is determined based on the calculated probability.

According to various aspects of the subject technology, a non-transitory machine-readable medium having stored thereon machine-readable instructions executable for detecting anomalous access to tables is described. A query for accessing a table from a requesting user is received. A set of users similar to the requesting user is determined. The probability that the requesting user should access the table is calculated. Whether the user should be accessing the table based on the calculated probability is determined.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
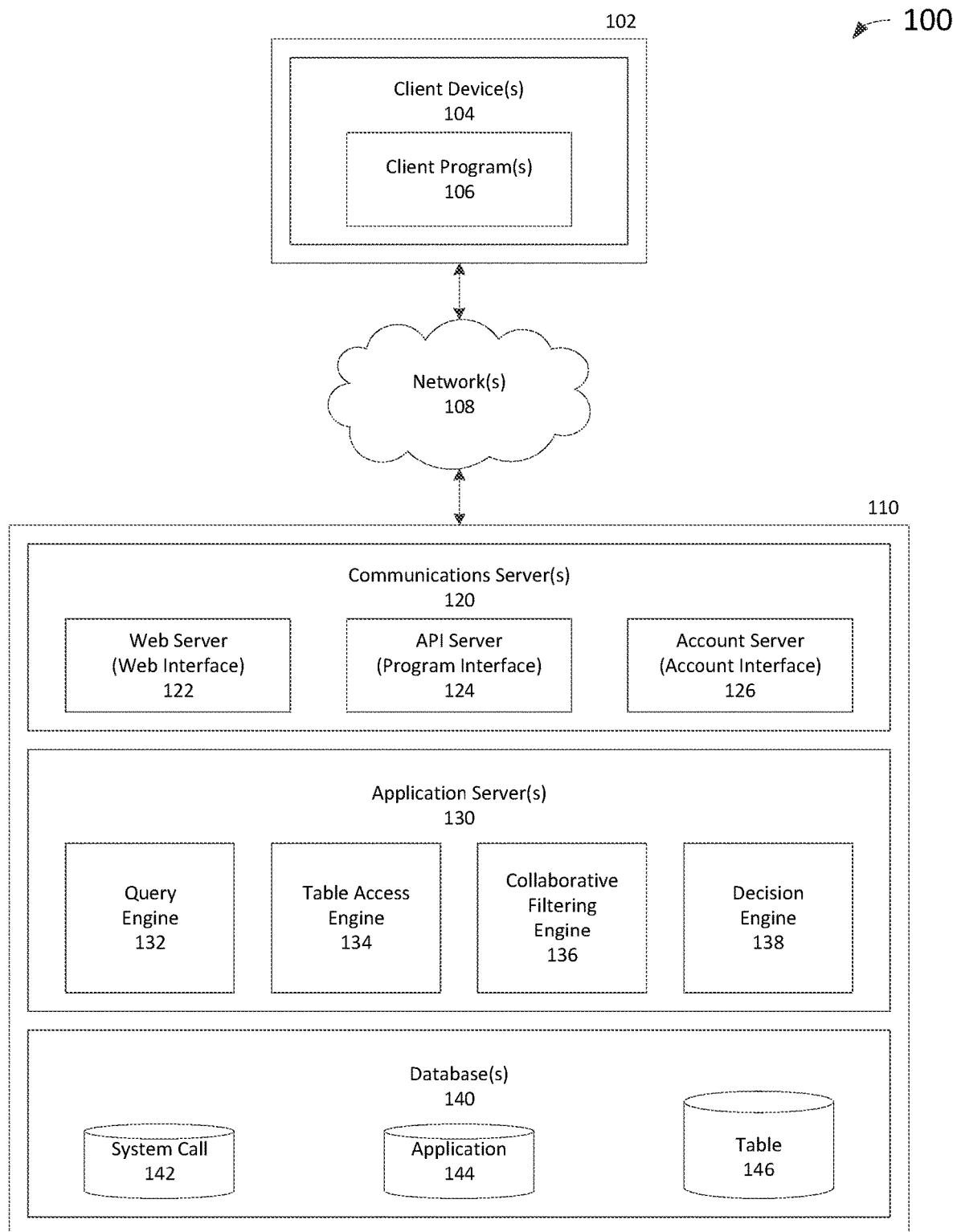
FIG. 1 is a block diagram of an exemplary computing system on which the detection of anomalous access to tables may be performed.

While there many different ways to restrict access to tables, most restriction rely on hard and fast rules. For example, access to a table may be determined based on a list of users to whom access is permitted. Such lists, however, are static and may require continuous maintenance. For example, in a large corporation where employees are constantly joining and leaving the workforce, access lists may require regular updates to remain accurate. As such, resources may be expended for simply keeping the list current. Dynamic management of access that requires minimal to no human interaction may thus be preferred.

In order to serve better serve the needs of a corporation, a solution based on calculating the probability for a given user, table pair may be implemented to determine if it's logical for a given user to access a given table. The probability may be calculated based on other similar users (e.g., team members that are working on the same business solution). Similar users may, in turn, be determined based on their historic table access in relation to other users who display similar access patterns. This method is closely related to collaborative filtering; however, instead of recommending products, the proposed method determines the probability that a specific user will use a specific table. Thus, when a new query for accessing a table (e.g., a table containing sensitive information) is processed, the probability that the given user should be using the table can be calculated. The calculated probability may then be used to determine whether or not the user is accessing a table with which he's supposed to be working. In other words, given a user and a query, the method can determine if it's ok that the user is granted access to this data.

As discussed above, absent such a method, a corporation may be subject to activities such as an "insider threat," where an employee may be granted access to sensitive data and the employee can exploit to the detriment of the corporation. Another possible scenario is a bad actor taking over an account, and gaining access to sensitive data. Under the proposed method, an insider account (e.g., one that belongs to the corporation) may be prevented from accessing certain data that the owner of the account isn't supposed to be working with. That is, despite being a part of the corporation, the user may not have any business accessing certain data that is outside of the user's scope of employment. By detecting such scenarios, the method may either raise a red flag when such activity occurs, or may prevent access to the data in the first place.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

FIG. 1 is a block diagram of an exemplary computing system on which the detection of anomalous access to tables may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services such as tools for verifying URLs based on information collected about customers. Application servers 130 may include multiple servers and/or components. For example, application servers 130 may include a query engine 132, table access engine 134, collaborative filtering engine 136, and/or decision engine 138. These servers and/or components, which may be in addition to other servers, may be structured and arranged to detect anomalous access to tables.

Application servers 130, in turn, may be coupled to and capable of accessing one or more databases 140 including system call database 142, application database 144, and/or table database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
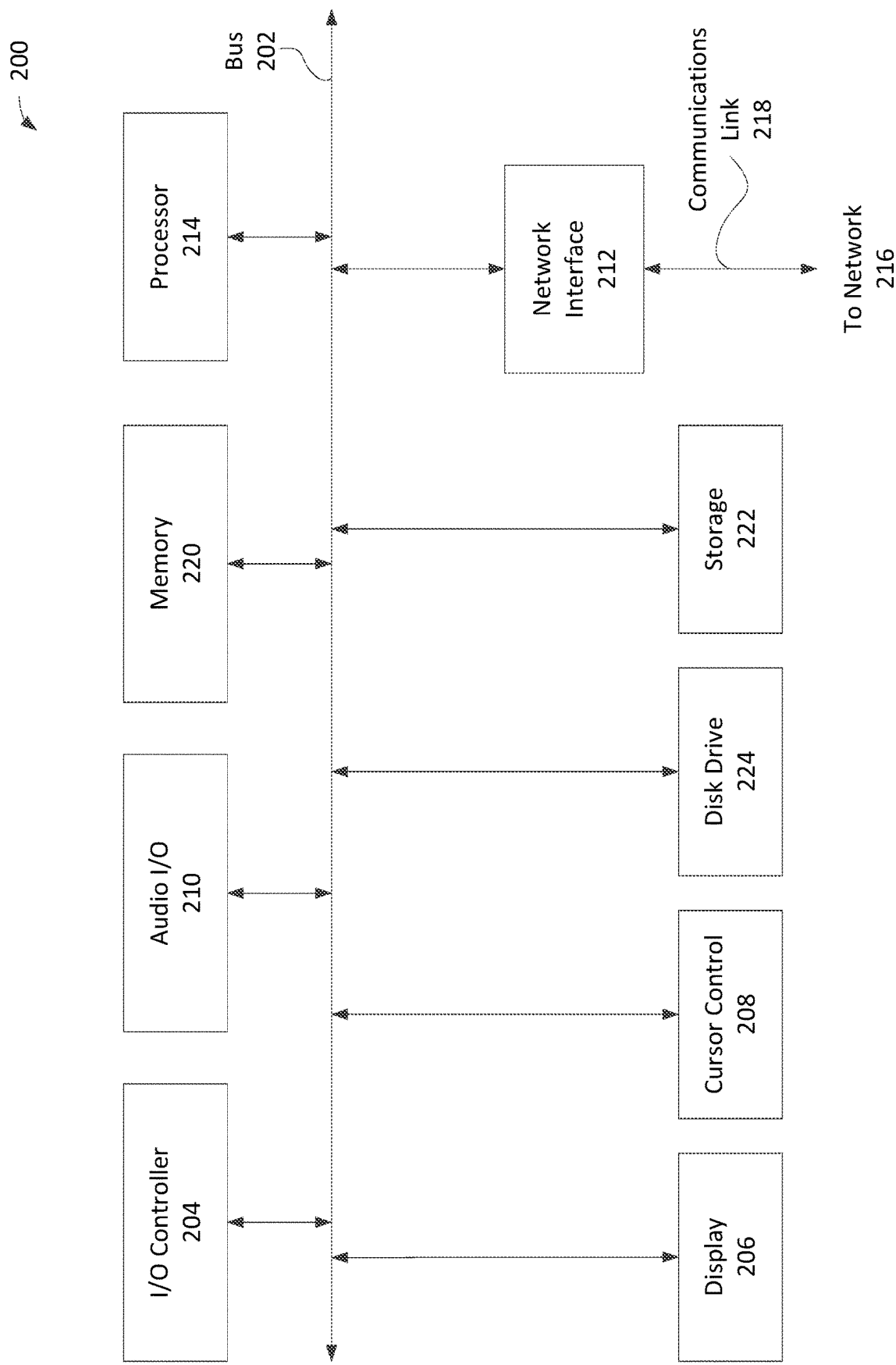
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

One technique that may be employed to detect anomalous access to tables is to utilize access patterns of both users and tables. By taking into account all users and tables, usage behavior of all users and tables may be learned. Information may further be gleaned from users' relationships with one another. Since the proposed method is not only looking at query-query similarities but also user-user similarities, account users that work in teams or groups are automatically taken into account because they are most likely to execute similar queries.

Figure 3:
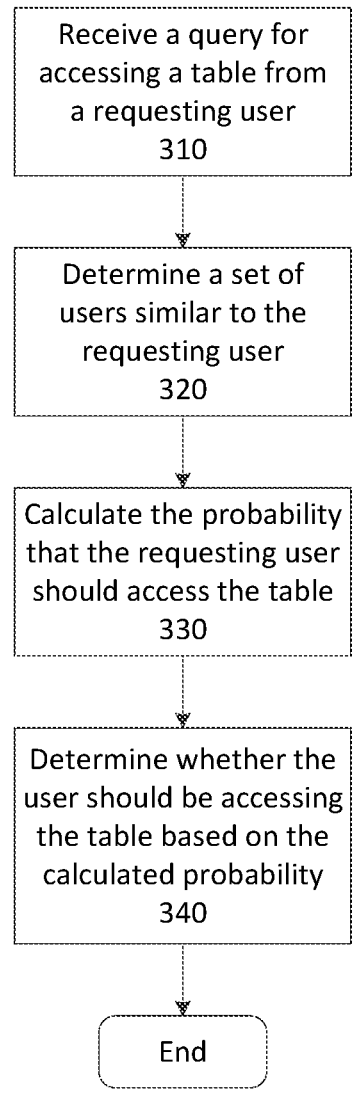
FIG. 3 illustrates an exemplary process 300 for detecting anomalous access to tables.

FIG. 3 illustrates an exemplary process 300 for detecting anomalous access to tables. In step 310, a query for accessing a table is received from a requesting user. This occurs when an employee of a corporation requests access to a table. Example tables may include tables that store customer information. Customer information may, in turn, include personal personally identifiable information (e.g., name, address, social security number, etc.), which is sensitive from a privacy perspective. Customer information may further include account information, such as credit card number, address associated with the credit card, bank account numbers, routing numbers, etc. Both sets of information can be misused if the information were to fall into the wrong hands.

In step 320, a set of users similar to the requesting user is determined. Example of similar users include employees that are on the same team, or are working on the same business solution. In some embodiments, similar users may be determined based on a company's organization chart. That is, employees that belong to the same team (e.g., legal, accounting, etc.) or report the same supervisor(s) may be identified as similar users. Alternatively, similar users may be determined based on the history of their table access. In other words, users who have a historical tendency to access the same tables will be considered similar users.

In step 330, the probability that the requesting user should be accessing the table is calculated based on a collaborative filtering method. While typically used to recommend products (e.g., recommendation of similar or complementary products during an online shopping trip), collaborative filtering is used in this instance to calculate the probability that a given user would use a particular table. The likelihood that the requesting user would access the table provides an indication of whether or not that user should have access to the table. For example, if the set of users similar to the requesting user have historically accessed a table, then it's likely that the requesting user would want to access the same table. Conversely, if the set of similar users has never accessed a particular table, then it's unlikely that the requesting user would access that particular table. Said another way, there would be little to no reason for the requesting user to need access to a particular table that none of his team members have accessed in the past, and such request for access may very likely be made outside of the scope of a work related project.

In step 340, a determination of whether the user should be accessing the table is made based on the probability calculated in step 330. In one embodiment, a threshold probability may be set such that if it's exceeded, then it would be determined that the user should be accessing the table. If the threshold however is not met, then the determination is made that the requesting user should not be accessing the table. An alert may be provided any time a determination is made, based on the probability, that the user should not be accessing the table. In some instances, the requesting user may be blocked from accessing the requested table. Alternatively, the request may be flagged for further review, and the user may be granted access pending the additional review.

The rationale underlying the prevention of a user from accessing a table that the user is calculated as being unlikely to access is that if the user isn't likely to access a table, then the user should not be provided access to the table. Such application of collaborative filtering is unique in that a determination isn't made for the purpose of recommending an item (in this case, a table), but to determine whether or not a user should have access based on the concept of whether the table should be recommended to the user. Collaborative filtering in this case uses the information available about the requesting user and the set of users similar to the requesting user to determine if the user should or should not have access to a table. As mentioned above, the peers (e.g., team members) may identified by access history as well as by organization chart.

Figure 4:
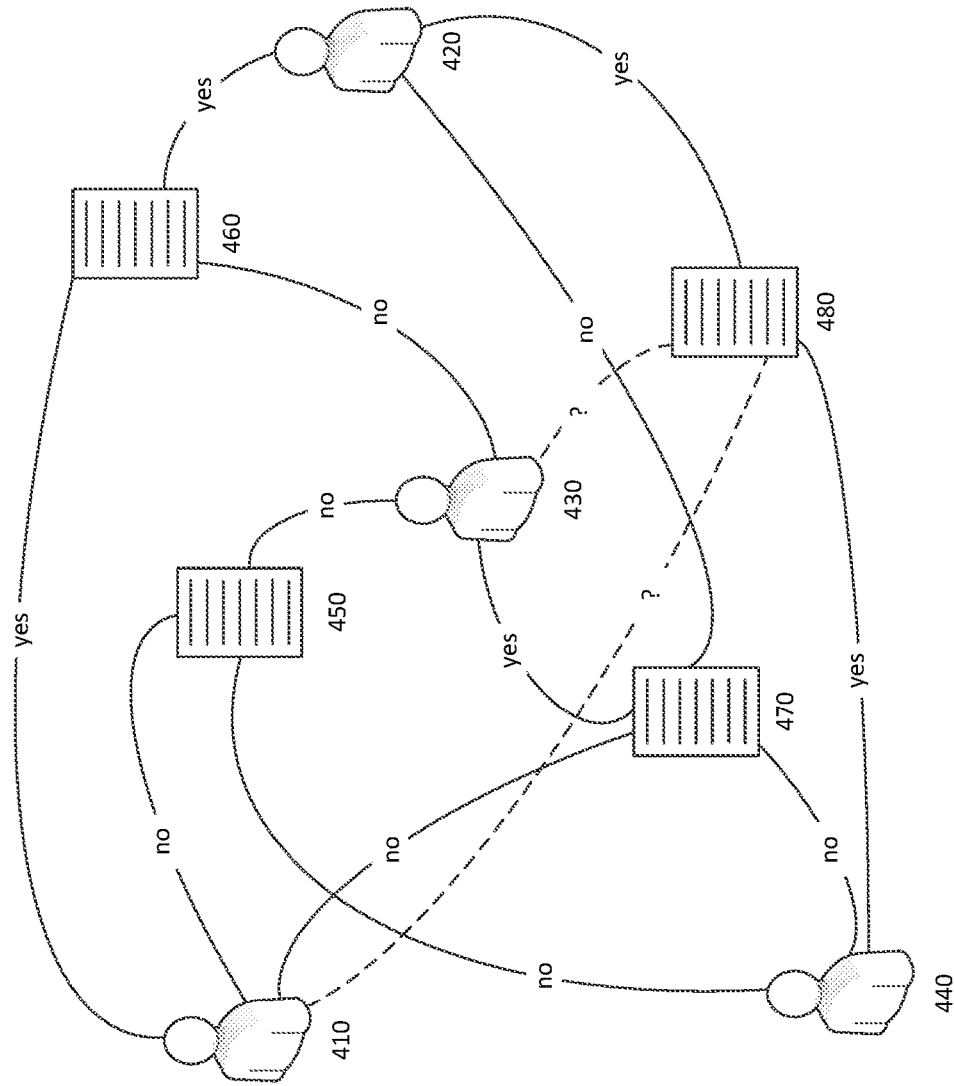
FIG. 4 provides an example graphical depiction collaborative filtering being applied to determining the likelihood of a user to access a table.

FIG. 4 provides an example graphical depiction of how collaborative filtering may be uniquely used to determine the likelihood of a user to access a table. For example, a history of access to different tables by different people may be recorded. This access may be recorded as a binary function—whether a particular user has accessed a particular table in the past or not. Alternatively, the access may be recorded to capture the frequency at which the particular user accesses the particular table. The example provided in FIG. 4 is a simplistic one and used to simply demonstrate how collaborative filtering may be applied.

As shown in the example, user 410 has accessed table 460, but not tables 450 and 470; user 420 has accessed tables 460 and 480, but not table 470; user 430 has accessed table 470, but not tables 450 and 460; and user 440 has accessed table 480, but not tables 450 and 470. Based on such an access history, a collaborative filtering method may determine the likelihood that user 410 will access table 480. Because user 410 has similar access patterns to users 420 and 440, a collaborative filtering method will make a determination that it's likely that user 410 will access table 480. This likelihood of access in turn provides a signal that it would not be unusual for user 410 to access table 480. As such, no restrictions would be placed on a request for such access, nor would any red flags be raised.

Conversely, a request by user 430 to access table 480 may raise a red flag as the likelihood of this access would be low based on the collaborative filtering method being applied to historical access of the other users. Consequently, a request to access table 480 by user 430 may be denied. In other words, the low probability provides a signal that it would be unusual for user 430 to access table 480. As such, a restrictions may be placed on the request for such access.

In some embodiments, a recency function may also be applied to the historical access data. Ostensibly, the more recent a table is accessed by a user, the more likely the user and other like users will access that table. Additionally, weights may be applied to scores such that a more recently recorded access is assigned a higher weight than a less recently recorded access when calculating the probability that a requesting user would access a requested table. Furthermore, a cut off may be used so that stale historical data may be disregarded. In other word, an access that occurred earlier than a predefined period of time will not be taken into consideration by the collaborative filtering method.

In general, predictions are built upon the usage of users similar to the requesting user. As discussed above, similar users may be determined based on historical data. However, in certain instances, there may not be any historical data for the requesting user. For example, the requesting user may be a new employee of the corporation and have no history of table access. In order to address this "cold start" issue, a different approach may be utilized.

Figure 5:
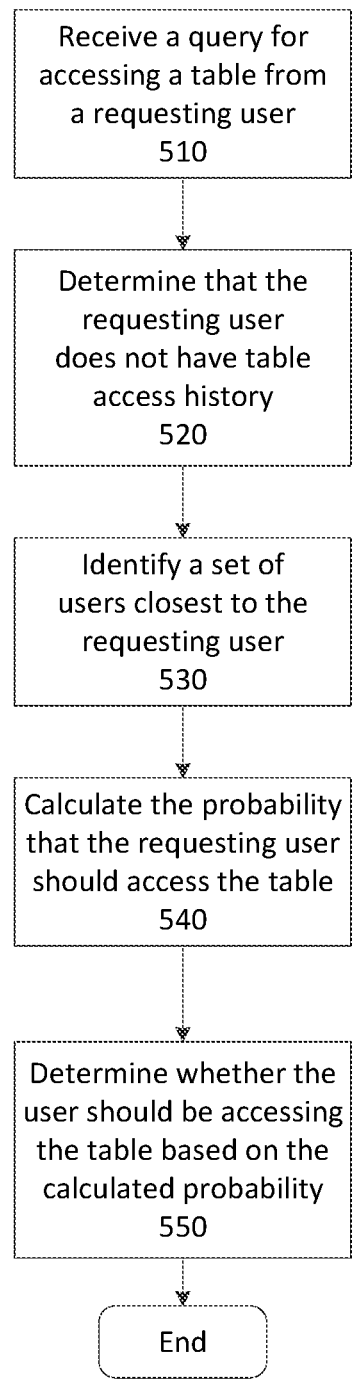
FIG. 5 illustrates an exemplary process 500 for detecting anomalous access to tables for a new user.

FIG. 5 illustrates an exemplary process 500 for detecting anomalous access to tables for a new user. In step 510, a query for accessing a table is received from a requesting user. As discussed above, this occurs when an employee of a corporation requests access to a table, except in this case, the requesting user may be a new employee of the corporation. In step 520, a determination is made that the requesting user does not have any table access history because the requesting user is a new employee. As such, alternative measures must be taken to determine which other users within the corporation is closest to the requesting user. In step 530, the system identifies a set of users closest to the requesting user. That is, the system may look up the requesting user to determine who the k closest users to the requesting user are, where k may be a number defined by the system or by an administrator. In one embodiment, this identification may be based on an organization chart. For example, individuals that report to the same manager may be determined to be similar users. Other examples include users having the same title or working in the same department. In some instances, information about members of a team may be made available.

Once the set of users closest to the requesting user has been identified, the probability that the requesting user should be accessing the table is calculated based on a collaborative filtering method in step 540. As discussed above, the likelihood that the requesting user would access the table provides an indication of whether or not that user should have access to the table. For example, if the set of users similar to the requesting user have accessed the requested table, then it's likely that the requesting user would want access to the same table. Conversely, if the set of similar users has never accessed the particular table, it's unlikely that the requesting user would access that particular table. This unlikelihood suggests that there would be little to no reason for the requesting user to need to access the particular table, particularly since few or none of his team members have accessed the table in the past.

In step 550, a determination of whether the user should be accessing the table is made based on the probability calculated in step 540. This determination may be made based on a predetermined threshold probability that, if exceeded, would suggest that the user should be accessing the table. If the threshold however is not met, then the determination is made that the requesting user should not be accessing the table.

In some embodiments, the proximity of users may be calculated as vectors. That is, every vector represents a user, and the closeness of two users is determined based on the distance between the two vectors. Each vector may be of size: #Number_Of_Unique_Tables, and its value correlates to the number of accesses a user performed for that table. Each vector contains all access history for each user. For example, user A accessed tables X, Y, and Z 5, 3, and 7 times accordingly, but never accessed tables W and M. Accordingly, user A's representative vector is: {5, 3, 7, 0, 0}. The distance between two users is determined by the distance between their vectors. There're several methods to calculate this distance including, for example, cosine similarity (which is a model agnostic approach). In addition, there's another method which is based on building a model that creates new vectors based on the entire dataset (users and tables data). This way, each vector describes not only user accesses, but also features that are based on the relationship of all the tables and users. For example, one such algorithm is Matrix Factorization, or specifically Alternating Least Squares (ALS).

In some embodiments, an identification of the k closest tables may also be made. This identification is made similar to the way similar users are identified. Specifically, tables are determined to be close to one another when they are accessed by a similar group of users. Logically, if a user accesses one table, then it's likely that the user will access another table that's close to the one that the user has accessed, even is there's no history of access. Accordingly, the system would not deny access to the closely related table upon request by the user.

In some embodiments, a large table access is built based on historical information. Specifically, access data is being monitored and logged, and this information is constantly updated in order to reflect real time access patterns. For every X amount of time (e.g., once a day, once every few hours, etc.), we can retrieve this data and use it to update our model. The model obtains this data as an input and identifies anomalies based on distances between users and tables. For example, such an anomaly can be represented by a user accessing a table that is very different (distant) from the tables he normally accesses (e.g., a user that accesses a table that is very different (distant) from tables accesses by his closest neighbors).

It is computationally inefficient to calculate for all users. Since usually the number of tables is significantly higher than the amount of users, each user will usually only access a small subset of those tables, which will cause the user's access vector to be very sparse. This makes the calculation more complex. In order to address this issue, our method represents the data as a tuple of (<user>,<table>) only for tables which a user has actually accessed. So if a user (e.g., user A) did not access a specific table (e.g., table M), this tuple (A,M) will not exist in this representation.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for detecting anomalous data access, comprising:
   a non-transitory memory storing instructions; and
   one or more hardware processors coupled to the non-transitory memory and configured to read the instructions from the non-transitory memory to cause the system to perform operations comprising:
      receiving, from a requesting user, a query for accessing a set of data from a data storage;
      determining that the requesting user has no history of accessing the set of data from the data storage;
      in response to the determining that the requesting user has no history of accessing the set of data from the data storage, determining a likelihood of the requesting user requesting access to the set of data by:
         determining a set of users that shares one or more common organizational attributes with the requesting user within an organization;
         comparing a first data access pattern associated with the requesting user against data access patterns associated with the set of users;
         identifying, from the set of users, a subset of users based on the comparing, wherein the subset of users is associated with a subset of the data access patterns that matches the first data access pattern within a threshold;
         obtaining a data access history associated with the subset of users, wherein the data access history comprises data accesses of different data in the data storage by the subset of users; and
         calculating the likelihood of the requesting user requesting access to the set of data based on the data accesses by the subset of users; and
      determining whether to restrict the requesting user from accessing the set of data based on the calculated likelihood.

2. The system of claim 1, wherein the set of data comprises at least one of personal identifiable information of customers of the organization or unique identifiers of financial instruments.

3. The system of claim 1, wherein the determining the set of users that shares the one or more common organizational attributes with the requesting user is based on an organization chart of the organization.

4. The system of claim 3, wherein the determining the set of users that shares the one or more common organizational attributes with the requesting user is further based on a common project to which the requesting user and the set of users are assigned.

5. The system of claim 1, wherein the determining the set of users that shares the one or more common organizational attributes with the requesting user is based on historical data stored in the data storage.

6. The system of claim 1, wherein the likelihood is calculated using collaborative filtering.

7. The system of claim 1, wherein the determining whether to restrict the requesting user from accessing the set of data is further based on whether the calculated likelihood exceeds a predetermined threshold.

8. A method for detecting anomalous data access, the method comprising:
   receiving, by one or more hardware processors from a requesting user, a query for accessing a set of data;
   determining, by the one or more hardware processors, that the requesting user lacks a history of accessing the set of data;
   in response to the determining that the requesting user lacks a history of accessing the set of data, determining, by the one or more hardware processors, a likelihood of the requesting user requesting access to the set of data by:
      identifying, by the one or more hardware processors, a set of users that shares one or more organizational attributes with the requesting user within an organization;
      comparing, by the one or more hardware processors, a first data access pattern associated with the requesting user against data access patterns associated with the set of users;
      identifying, by the one or more hardware processors from the set of users, a subset of users based on the comparing, wherein the subset of users is associated with a subset of the data access patterns that matches the first data access pattern within a threshold;
      obtaining, by the one or more hardware processors, a data access history associated with the subset of users, wherein the data access history comprises data accesses of different data by the subset of users; and
      calculating, by the one or more hardware processors, the likelihood of the requesting user accessing the set of data based on the data accesses by the subset of users; and
   determining whether to grant the requesting user access to the set of data based on the calculated likelihood.

9. The method of claim 8, wherein the requesting user is an employee of the organization.

10. The method of claim 8, wherein the identifying the set of users that shares one or more organizational attributes with the requesting user is based on an organization chart of the organization.

11. The method of claim 8, wherein the set of users comprises a predefined number of users.

12. The method of claim 8, wherein the set of users is identified further based on at least one of a manager associated with the requesting user, a title associated with the requesting user, or a department associated with the requesting user.

13. The method of claim 8, wherein the likelihood is calculated using collaborative filtering.

14. The method of claim 8, wherein the set of data comprises at least one of personal identifiable information of customers of the organization or unique identifiers of financial instruments.

15. A non-transitory machine-readable medium having stored thereon machine-readable instructions executable to cause a machine to perform operations comprising:
   receiving, from a requesting user, a query for accessing a set of data;
   determining that the requesting user has no history of accessing the set of data;
   in response to the determining that the requesting user has no history of accessing the set of data, determining a likelihood of the requesting user requesting access to the set of data by:
      determining a set of users that shares one or more common organizational attributes with the requesting user within an organization;
      comparing a first data access pattern associated with the requesting user against data access patterns associated with the set of users;
      identifying, from the set of users, a subset of users based on the comparing, wherein the subset of users is associated with a subset of the data access patterns that matches the first data access pattern within a threshold;
      obtaining a data access history associated with the subset of users, wherein the data access history comprises data accesses of different data by the subset of users; and
      calculating a likelihood of the requesting user accessing the set of data based on the data accesses by the subset of users; and
   determining whether to restrict the user from accessing the set of data based on the calculated likelihood.

16. The non-transitory machine-readable medium of claim 15, wherein the set of data comprises at least one of personal identifiable information of customers or the organization or unique identifiers of financial instruments.

17. The non-transitory machine-readable medium of claim 15, wherein the determining the set of users that shares the one or more common organizational attributes with the requesting user is based on an organization chart of the organization.

18. The non-transitory machine-readable medium of claim 17, wherein the determining the set of users that shares the one or more common organizational attributes with the requesting user is further based on a common project to which the set of users and the requesting user are assigned.

19. The non-transitory machine-readable medium of claim 15, wherein the determining the set of users that shares the one or more common organizational attributes with the requesting user is based on historical data.

20. The non-transitory machine-readable medium of claim 15, wherein the likelihood is calculated using collaborative filtering.

* * * * *